United States Patent [19]

Radici et al.

[11] 4,097,453

[45] Jun. 27, 1978

[54] PROCESS FOR THE PREPARATION OF ETHERIFIED ACETAL POLYMERS

[75] Inventors: Pierino Radici, Turate (Como); Sergio Custro, Gorla Maggiore (Varese); Paolo Colombo, Saronno (Varese), all of Italy

[73] Assignee: Societa' Italiana Resine S.I.R. S.p.A., Milan, Italy

[21] Appl. No.: 642,811

[22] Filed: Dec. 22, 1975

[30] Foreign Application Priority Data

Dec. 20, 1974 Italy .................................. 30831/74

[51] Int. Cl.$^2$ .............................................. C08K 5/42
[52] U.S. Cl. ........................ 260/45.9 P; 260/45.85 B; 260/45.9 QB; 260/45.9 R; 260/45.95 R
[58] Field of Search ................. 260/45.9 R, 45.9 QB, 260/45.85 B, 45.95, 45.9 P, 45.95 B, 67 FP

[56] References Cited

U.S. PATENT DOCUMENTS

| | | | |
|---|---|---|---|
| 2,871,220 | 1/1959 | MacDonald | 260/45.95 |
| 2,920,059 | 1/1960 | MacDonald et al. | 260/45.9 P |
| 2,965,605 | 12/1960 | Reynolds et al. | 260/45.9 QB |
| 2,966,476 | 12/1960 | Kravlovec et al. | 260/45.95 B |
| 2,998,409 | 8/1961 | Nogare et al. | 260/45.95 |
| 3,072,603 | 1/1963 | Tholstrup | 260/45.9 QB |
| 3,081,280 | 3/1963 | Carlson | 260/45.9 |
| 3,244,672 | 4/1966 | Hermann et al. | 260/67 FP |
| 3,294,734 | 12/1966 | Schmidt et al. | 260/45.9 |
| 3,397,170 | 8/1968 | Fourcade et al. | 260/45.9 P |
| 3,418,271 | 12/1968 | Wagner et al. | 260/45.9 P |
| 3,424,819 | 1/1969 | Green | 260/45.9 P |
| 3,484,400 | 12/1969 | Halek | 260/45.95 |
| 3,506,616 | 4/1970 | Wolf | 260/45.9 P |
| 3,903,197 | 9/1975 | Ishida et al. | 260/45.9 P |

*Primary Examiner*—Veronica P. Hoke
*Attorney, Agent, or Firm*—Sughrue, Rothwell, Mion, Zinn and Macpeak

[57] ABSTRACT

The unstable terminal hydroxyl groups of acetal polymers are etherified in a liquid reaction medium in the presence of organic additives.

19 Claims, No Drawings

PROCESS FOR THE PREPARATION OF ETHERIFIED ACETAL POLYMERS

The present invention relates to a process for the stabilization of acetal polymers, and more particularly to the transformation of the terminal hydroxyl groups of said acetal polymers into ether groups.

In the course of the present specification acetal polymers will be understood to signify those products, having a molecular weight exceeding about 10,000, which are obtained in the art of polymerization of an aldehyde, or by copolymerization of several different aldehydes, or else by copolymerization of one or more aldehydes with other non-aldehyde monomers.

It is also intended to include in this definition those acetal polymers which are obtained from cyclic oligomers of aldehydes, such as, for example, trioxan or tetraoxan (formaldehyde oligomers), or 2-formyl-3, 4-dihydro-2H pyran (acrolein dimer), by homopolymerization or by copolymerization with non-aldehyde monomers.

It is known that the unstable hydroyxl groups of the acetal polymers must be transformed into stable groups for the purpose of imparting to the said polymers those characteristics of thermal and chemical stability which are indispensable for their processing and practical use.

The transformation of the hydroxyl groups into ester groups, by means of a reaction with anhydrides of carboxylic acids, and in general with acetic anhydride, constitutes practically the only technique used. The transformation of the hydroxyl groups into ether groups instead is not exploited in practice, notwithstanding the fact that the acetal polymers with ether terminal groups exhibit a greater thermal and chemical stability than those containing ester terminal groups.

In fact, the thermal decomposition of the ester group in a nitrogen atmosphere generally occurs at around 240°–260° C, whereas the decomposition of the ether groups occurs at 280°–320° C.

There are other valid reasons for preferring to convert the hydroxyl groups of the acetal polymers in to ether groups.

In fact, the ester groups are easily hydrolized by alkaline agents. Furthermore, the greater thermal and chemical resistance of the ether groups renders the choice of those additives and stabilizers (such as, for example, phenolic compounds and basic organic compounds containing nitrogen) which are normally added to the acetal polymers, less problematic.

The reasons for which the technique involving the etherification of the acetal polymers is not exploited in practice lie mainly in the difficulty connected with the reaction systems required for achieving this purpose.

The known methods of etherification consist in: transetherification, etherification by means of vinyl compounds, etherification by means of organic halides and etherification by means of cyclic compounds. Transetherification constitutes the only method, amongst those mentioned, which has yielded partly positive results from the point of view of the recovery and the thermal and chemical stability of the etherified product.

The other methods have not yielded acceptable results particularly because of the poor activity of the reagents in the conditions of etherification.

According to the transetherification method the terminal hydroxyl groups of the acetal polymers are transformed into ethers by reaction with dialkyl-acetals, ortho-esters, ketals or orthocarbonates in the presence of catalysts, the polymer being maintained dissolved or suspended in the reaction medium.

When operating in this manner, the difficulties which are encountered are mainly connected with the reaction system used.

In fact, the transetherification reaction occurs in the presence of catalysts of the cationic type such as boron trifluoride, or its complexes such as boron trifluoride etherate or the complex salts of fluoboric acid, for instance, p-nitrobenzenediazofluoborate, or strong or medium strong mineral acids, whose dissociation constant, or constant of the first acid dissociation, is greater than $10^{-7}$. Examples of such acids are: sulphuric acid, phosphoric acid and perchloric acid.

Other catalysts known for this purpose are strong, or medium strong, organic acids, whose constant of dissociation is greater than $10^{-6}$ (such as p-toluenesulphonic acid, acetic acid and oxalic acid), or phenols with a pK greater than 5.5, or organic esters of strong or medium strong acids (mineral or organic), such as ethyl sulphate, methyl phosphate or methyl p-toluene-sulphonate).

This method of proceeding promotes, apart from the blocking reaction of the terminal hydroxyl groups, a transacetalization reaction within the macromolecular chain, resulting in a diminution of the molecular weight of the polymer with respect to the initial value and also a loss of product due to unzippering, of a greater or lesser extent, of one of the two polymeric chains resulting from the attack of the catalyst.

In the prior art attempts have been made to limit the transacetalization reaction by altering the etherification conditions, or by selecting acetal polymers with particular characteristics.

For example use has been made of polymers with a crystallinity index equal to 100% and, furthermore, the blocking reaction of the terminal groups has been carried out at both low and high temperatures, with a polymer either suspended or dissolved in the reaction medium.

In every case the results obtained were unsatisfactory.

In fact, at low temperatures one obtains low reaction speeds with poor yields of stabilized polymer.

At higher temperatures, operating with either suspended or dissolved polymers, one obtains high reaction speeds with acceptable yields of stabilized polymer.

However, the molecular weight of the polymer suffers a drastic reduction with respect to the initial value, such as to make it useless for practical purposes. A notable improvement in the etherification of the terminal hydroxyl groups of the acetal polymers is achieved by the process described in the French Pat. No. 2,173,921. By means of this process it is possible to achieve high etherification reaction speeds and a considerable reduction of the unwanted molecular weight diminution phenomena, the operation being carried out with an acetal polymer suspended in a particular reaction medium.

More precisely, such a medium, which is liquid under the operating conditions, comprises a substance solvent for the polymer and a substance in which the polymer is insoluble, the said solvent and non-solvent substances being completely miscible at the reaction temperature, but immiscible, or not readily miscible, at temperatures lower than the reaction temperature. By operating as described in the above mentioned Patent an increased recovery of the stabilized acetal polymer is achieved.

However, the phenomenon of molecular weight diminution, linked to the presence of catalysts which by their very nature give rise to the transacetalization reaction, although reduced, is not completely eliminated.

In the final analysis, this fact has limited the application of the etherification method to acetal polymers having a very high molecular weight. The use of catalysts which do not foster the transacetalization reaction of the acetal polymer, such as, for example, molybdenum or titanium acetylacetonates or ion-exchange resins, involves purification problems of the final product, or requires special expedients or reaction mediums.

It has now been discovered that one can eliminate the disadvantages of the prior art encountered in blocking the unstable hydroxyl groups of the acetal polymers by etherification.

The present invention is essentially based on the discovery according to which the presence of substances belonging to classes, which will be further defined, in the etherification, medium, allows the said etherification to be carried out at a high temperature and at high speed, while practically completely avoiding the transacetalization phenomenon within the polymeric chain of the acetal polymers.

Therefore the process of the present invention consists essentially in carrying out the etherification of the terminal and unstable groups of an acetal polymer with an orthoester, an epoxide or an acetal in a liquid reaction medium, in the presence of one or more additives belonging to the following classes:

Class A

To this class belong the compounds which are defined by the general formula:

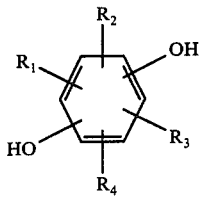

where $R_1$, $R_2$ are alkyl radicals containing from 1 to 18 carbon atoms; $R_3$, $R_4$ are either hydrogen or are identical to $R_1$ and $R_2$.

Examples of such compounds are: 2, 5-di-tert-amyl-hydroquinone and 2,5-di-isopropyl-hydroquinone.

Class B

This class comprises the compounds which are definable by the general formula:

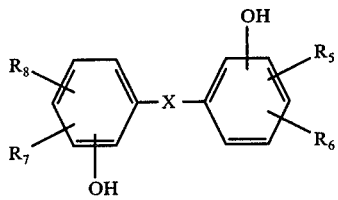

where X is oxygen, sulphur or an alkylene radical containing from 1 to 4 carbon atoms; $R_5$, $R_6$, $R_7$, $R_8$ are hydrogen, or alkyl radicals containing from 1 to 18 carbon atoms. Examples of such compounds are: 4,4'thiobis(5-tert-butyl-2-methylphenyl); para,para'-isopropylidenediphenol; 1,1-bis(2-methyl-4-hydroxy-5-tert-butylphenyl)butane.

CLASS C

This class comprises the compounds definable by the general formula:

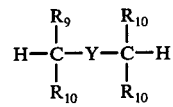

where Y is oxygen, sulphur, or an alkylene radical containing from 1 to 4 carbon atoms; $R_9$ is hydrogen or an alkyl radical containing from 1 to 18 carbon atoms, or is identical to $R_{10}$; $R_{10}$ is a substituted phenolic radical.

The compounds of class C can by synthesised by means of the condensation of phenols with unsaturated aldehydes or dialdehydes.

Examples of such compounds are: 1, 1,3 (or 4) - tris (2-methyl-4-hydroxy-5-tert-butylphenyl) butane.

Class D

To this class belong the compounds defined by the general formula:

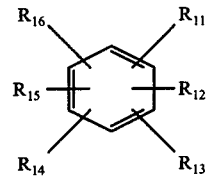

where $R_{11}$, $R_{13}$, $R_{15}$ are hydrogen or alkyl radicals containing from 1 to 18 carbon atoms; $R_{12}$, $R_{14}$, $R_{16}$ are substituted phenolic radicals.

Belonging to this class are the compounds: 1,3,5-trimethyl-2,4,6-tris(3,5-di-tert-butyl-4-hydroxybenzyl) benzene.

Class E

Belonging to this class are the compounds defined by the general formula:

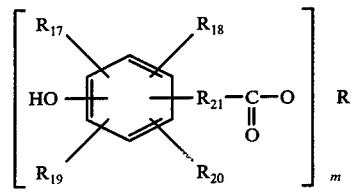

where $R_{17}$, $R_{19}$ are alkyl radicals containing from 1 to 4 carbon atoms preferably placed in the ortho positions; $R_{18}$, $R_{20}$ are hydrogen or alkyl radicals containing from 1 to 10 carbon atoms; $R_{21}$ is an alkylene radical containing from 1 to 4 carbon atoms; R is a saturated aliphatic hydrocarbon radical containing from 1 to 30 carbon atoms, deriving from the saturated mono or polyalcohol $R(OH)_m$ (with $m$ varying from 1 to 4).

Examples of such compounds are beta (3,5-di-tert-butyl-4-hydroxyphenyl) octadecyl-propionate; pentaerythritol tetra [β-(3,5-di-tert-butylphenol) propionate]; 1,4-butylenebis [β-(3,5-di-tert-butylphenol) proprionate].

Class F

Belonging to this class are the compounds defined by the general formula:

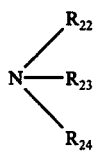

where $R_{22}$, $R_{23}$, $R_{24}$ are hydrogen, or alkyl radicals containing from 1 to 20 carbon atoms, or phenyl radicals (substituted or unsubstituted) or naphthyl radicals (substituted or unsubstituted). Examples of such compounds are: p-phenylenediamine; 4-(p-toluene-sulphonamide) diphenylamine.

Class G

Belonging to this class are the compounds defined by the general formula:

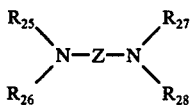

where $R_{25}$, $R_{26}$, $R_{27}$, $R_{28}$ are alkyl radicals containing from 1 to 10 carbon atoms, or phenyl radicals (substituted or unsubstituted); or naphthyl radicals (substituted or unsubstituted), Z is a phenylene, alkylene or cycloalkylene radical (substituted or unsubstituted).

Belonging to this class is the compound: N,N'-di-sec-butyl-N,N'-dimethyl-p-phenylenediamine.

It has been found that when carrying out the etherification in the presence of compounds belonging to the aforementioned classes and within the ambit of the conditions which will be further described, it is possible to obtain practically quantitative recoveries of the etherified product, with a molecular weight of the polymer practically unaltered with respect to the initial molecular weight.

The advantages inherent in the use of the additives of the present invention can be obtained when blocking the terminal hydroxyl groups of the acetal polymers by means of any of the known etherification techniques. Thus, it is possible to bring the etherification reagent into contact with the acetal polymer dissolved or suspended in a liquid reaction medium, the said reaction medium being inert with regard to the polymer and the other constituents of the reaction medium. When the reaction is carried out in the manner described, the etherification reagent is usually kept dissolved in the reaction medium.

It is also possible to operate in accordance with another known technique which provides for the etherification reagent to be brought into contact with the acetal polymer in the form of a slurry with a liquid substance which is a non-solvent for the actual polymer.

Finally, the etherification reaction can be carried out by feeding the gaseous reagent to the solid acetal polymer.

According to a preferred method of carrying out the process of the present invention, the reagent is brought into contact with the acetal polymer suspended in a reaction medium which is liquid in the reaction conditions, the said reaction medium consisting of at least one substance which is a solvent, and at least one substance which is a non-solvent for the polymer, the said solvent and non-solvent substances being completely miscible at the reaction temperature but immiscible or partly miscible at temperatures substantially lower than the reaction temperature.

Such a technique has been described in the Italian Pat. No. 946,165.

Whatever the etherification method may be, the use of the additives of the present invention enable one to obtain distinctly better results compared with those obtained in their absence and using the catalysts of the prior art.

More particularly, the amount of additive used can vary within a wide range of values dependent on the nature of the actual additive, the reagent used and the selected etherification technique.

In general, the said amount can vary from 0.05 to 5 and preferably from 0.1 to 1 parts by weight for every 100 parts of the liquid reaction medium.

The temperature and the duration of the etherification reaction are not critical.

In particular, the temperatures values can vary within a range of from 50° to 200° C, although the best results are obtained by operating between 120° and 180° C.

When the selected temperature is higher than the boiling point of the liquid reaction medium, one operates at a pressure higher than atmospheric for the purpose of preventing the vaporization of the liquid substances.

The duration of the reaction has practically no other limit than that required for completing the etherification. The times required usually vary from 1 to 120 minutes, depending on the temperature and the nature of the selected reaction system, it being in every case preferable to operate in conditions ensuring a high reaction speed.

The reagents suitable for the etherification of the hydroxyl groups of the acetal polymers belong to the following classes of compounds: - Orthoesters, such as: orthoformic, orthoacetic and orthocarbonic esters of methyl, ethyl, or higher aliphatic alcohols, of cycloaliphatic alcohols or of aromatic alcohols; - epoxides, such as ethylene oxide and propylene oxide, - acetals, such as methylal, 1,1-dimethoxyethane and 1,1-dimethoxydimethyl ether.

In the case when one uses a reaction medium of the type described in the aforementioned French Pat. No. 2,173,921 said reaction medium comprises a substance which is inert, liquid and solvent for the polymer in the conditions under which the blocking of the hydroxyl groups occurs.

Such a substance is generally selected from the following classes of compounds; simple or substituted amides, such as dimethylformamide or dimethylaetamide; esters such as butyl acetate and methylene glycol di-acetate; aromatic nitroderivatives such as nitrobenzene; sulphoxides, such as dimethylsulphoxide; nitriles; lactones, such as γ-butyrolactone and caprolacetone; aromatic chlorinated derivatives such as o-dichlorobenzene.

The reaction medium also contains, in the case under discussion, an inert substance, which is liquid in the conditions under which one operates, and in which the acetal polymer is insoluble in the conditions in which the transformation of the hydroxyl groups into ether groups takes place.

Among such non-solvent substances of use are saturated aliphatic hydrocarbons having linear or branched chains, cyclo-aliphatic hydrocarbons, and alkylaromatic hydrocarbons.

Moreover, the solvent and non-solvent substances must be miscible at the temperatures of etherification, whilst they must be immiscible or poorly miscible at temperatures lower than the reaction temperature, such as, for example, the ambient temperature (20°–25° C). According to the preferred embodiment of the process of the present invention, the acetal polymer is suspended in this reaction medium and then etherified under the conditions and in the presence of the catalyst and the additive previously described.

In the experimental Examples which follow, use has been made of a steel reactor, with a 5 liter capacity, provided with an anchor agitator, thermometric sheath, reflux condenser and a device which makes it possible to operate at a controlled pressure, while maintaining the system in an inert atmosphere by flushing with a flow of nitrogen.

The reactor is provided with a jacket for the circulation of oil, connected to the thermostat.

A suction element at the bottom of the reactor, allows by means of slight over-pressue, the removal of the reaction mixture, which is directly transferred, through a pipe, to a steel filter, 30 cm in diameter, provided with a heating chamber.

The filtering baffle comprises a steel network. The filter is completely closed in such a manner as to maintain a nitrogen atmosphere and is provided with a mobile disc for squeezing the wet filtered polymer.

The collection of the filtered liquid is effected in a glass flask with a capacity of 5 liters.

In the Examples, the parts and percentages are intended by weight unless otherwise specified.

Example 1 (comparison)

After flushing with nitrogen the apparatus the latter is loaded under agitation with 1620 grams of pure anhydrous ε-caprolactone, 80 grams of trimethyl orthoacetate, 3.2 grams of nitrobenzene-diazonium fluoborate and finally 170 grams of polyoxymethylene.

The polyoxymethylene is obtained prior to use by the polymerization of pure, monomeric formaldehyde, in an inert medium such as n-hexane, using an anionic type initiator. The polymer has an inherent viscosity of 1.60, measured at 60° C in a 0.5% (weight/volume) solution in p-chlorophenol to which is added 2% of α-pinene.

The system is heated by means of oil circulation in such a manner that the internal temperature is equal to 160° C. The solution of the polymer is kept at this temperature for 10 minutes.

The cooling step is then started and the polymer is gradually precipitated giving rise to a dense suspension.

The suspension is then transferred to the steel filter and the polymer is squeezed by the appropriate device.

The polymer remaining on the filter is thoroughly washed with toluene containing 1% of tributylamine and subsequently with toluene only. The moist powder is finally dried in a vacuum oven at 60° C, with the recovery of 166 grams of product.

The folowing measurements where made on the etherified polymer (P-1);
Inherent viscosity: $\eta_e$
Thermal degradation at 220° C in a nitrogen atmosphere: $K_{220}$ - speed of decomposition in percentage by weight of polymer per minute, during the first 30 minutes, measured with a thermobalance.

Alkali-stable fraction: ASF

A sample of the polymer is dissolved in benzyl alcohol containing 1% of triethanolamine for a period of 30 minutes. The polymer/benzyl alcohol ratio is equal to 1/10.

After precipitation of the polymer by cooling, the suspension is poured at 50° C into methanol and then filtered. The product recovered is kept in suspension in methanol at 100° C for one hour.

The suspension is then filtered and the polymer is thoroughly washed with methanol and finally dried in a vacuum oven at 60° C.

The remaining percentage of polymer indicates the alkalistable fraction.

The following measurements are made on this fraction:
Inherent viscosity: $\eta_e$ (ASF)
Thermal degradation at 220° C in a nitrogen atmosphere: $K_{220}$ (ASF)

The results obtained are summarized in Table 1.

Example 2

Using the procedure of Example 1, the reactor is charged with 1620 grams of pure, anhydrous ε-caprolactone, 80 grams of trimethyl orthoacetate, 3.2 grams of p-nitrobenzenediazonium fluoborate, 7.7 grams of diphenylamine and then 170 grams of the polyoxymethylene of Example 1.

The reaction is carried out at 160° C, for 10 minutes, the apparatus being heated by means of the thermostat.

The polymer finally recovered is washed with toluene containing 1% of tributylamine and then with methanol. The drying is effected in a vacuum oven at 60° C, 167.5 grams of etherified polyoxymethylene being obtained in this manner. The measurements described in Example 1 are carried out on this polyoxymethylene. The results are summarized in Table 1.

TABLE 1

| Examples | Yield(%) | $\eta_e$ | $K_{220}$ | ASF | $\eta_e$(ASF) | $K_{220}$(ASF) |
|---|---|---|---|---|---|---|
| P-1 | 97.5 | 0.80 | 0.04 | 97.5 | 0.82 | 0.02 |
| P-2 | 98.5 | 1.58 | 0.04 | 98,0 | 1.60 | 0.02 |

EXAMPLE 3 (comparison)

The reactor is charged, in the manner indicated, with 360 grams of dimethyl sulphoxide, 720 grams of n-dodecylbenzene, 300 grams of triethyl orthobenzoate, 6.25 grams of diethyl sulphate and finally 400 grams of polyoxymethylene. The polymer is obtained in the same manner as described in Example 1 and has an inherent viscosity of 2.50. The reactor is brought up to 145° C by means of a thermostat; the fluid suspension is kept at this temperature for 60 minutes and then cooling is started.

The suspension is filtered and the product remaining on the filter is squeezed and washed, first with toluene and then with methanol.

The liquid recovered in the collecting flask separates into two layers.

The etherified, moist polyoxymethylene is kept under agitation in suspension in a (1:1) water-methanol solution containing 10% of ammonia, at boiling point for 30 minutes. The polymer to solution ratio is of 1:5.

Finally the suspension is filtered and the polymer is thoroughly washed with water.

Drying is effected in a vacuum oven at 60° C, with a recovery of 390 grams of product.

The measurements described in Example 1 are effected on the polymer. The results are summarized in Table 2, under (P-3).

EXAMPLE 4

The reactor is charged in the manner indicated with 360 grams of dimethyl sulphoxide, 720 grams of n-dodecyl benzene, 300 grams of triethyl orthobenzoate, 6.25 grams of diethyl sulphate, 6 grams of 2,4-dimethyl-6-tert-butyl phenol and finally 400 grams of polyoxymethylene. The polymer is identical to that of Example 3.

The thermostatically controlled reactor is brought up to 145° C for a period of 60 minutes.

Subsequently, the suspension is cooled and filtered through the steel filter.

The liquid recovered in the collection flask separates, at low temperatures, into two layers.

The granular powder remaining on the filter is washed and treated in the manner described in Example 3.

After final drying one obtains 392 grams of product.

The measurements described in Example 1 are effected on the polymer (P-4). The results are summarized in Table 2.

TABLE 2

| Example | Yield% | $\eta_e$ | $K_{220}$ | ASF | $\eta_e$ASF | $K_{220}$ASF |
|---|---|---|---|---|---|---|
| (P-3) | 97.5 | 1.50 | 0.05 | 97.0 | 1.50 | 0.03 |
| (P-4) | 98.0 | 2.47 | 0.05 | 97.5 | 2.48 | 0.03 |

EXAMPLE 5

The reactor is charged in the manner indicated with 1,500 grams of linear paraffins ($C_{12}$–$C_{16}$), 150 grams of triethyl orthoformate, 3.5 grams of perchloric acid, 10.5 grams of octadecyl-$\beta$(3,5-di-tert-butyl-4-hydroxyphenyl) propionate and 300 grams of polyoxymethylene. The polymer is obtained as indicated in Example 1 and has an inherent viscosity of 1.40.

The reactor is brought to a temperature of 160° C by means of thermostatically controlled oil, and kept at this temperature for 5 minutes. The cooling step is then started. The suspension is transferred by means of slight overpressure to the steel filter. The remaining polymer is thoroughly washed with acetone, and then with water containing triethylamine and finally with acetone.

The moist polymer is dried in a vacuum oven at 60° C, and one recovers in this manner 286 grams of product with an inherent viscosity of 1.385.

The final product (P-5) when subjected to the thermal degradation test, has given a value of $K_{200}$ equal to 0.05 and when subjected to the alkaline attack test, an ASF value equal to 97%.

EXAMPLE 6

The reactor is charged with 1400 grams of nitrobenzene, 350 grams of hexamethylphosphoric triamide 7.5 grams of p-toluenesulphonic acid, 175 grams of 1,1-dimethoxydimethyl ether, 10 grams of 4,4'-thiobis(6-tert-butyl-3-methyl phenol) and 400 grams of polychloroacetaldehyde. The polymer is obtained by polymerization at a temperature of −70° C, using an anionic initiator, in a dispersing medium such as n-heptane. The system is heated by means of thermostatically controlled oil circulation in such a manner that the internal temperature is 155°–160° C. The suspension is maintained under these conditions for 30 minutes and the cooling is then started.

The suspension is transferred by slight overpressure on to the steel filter. The polymer is thoroughly washed with toluene and then with methanol containing triethylamine.

The moist polymer is dried in a vacuum oven at 60° C, and in this manner one recovers 392 grams of product.

The final product (P-6) when subjected to the thermal degradation test has given a value of $K_{220}$ equal to 0.05 and in the case of the alkaline attack test an ASF value equal to 96.5%.

EXAMPLE 7

The reactor is charged in the manner indicated in Example 1 with 1000 grams of o-dichlorobenzene, 1000 grams of n-decane, 42.5 grams of trimethyl orthobenzoate, 2.1 grams of phosphoric acid, 1.5 grams of N,N'-di-sec-butyl-dimethyl-p-phenylenediamine and finally 500 grams of polyoxymethylene identical to that of Example 1.

The reaction is carried out at 150° C for 20', the reactor being heated by means of thermostatically controlled oil.

The suspension is cooled to and filtered on the steel filter; the remaining polymer is thoroughly washed with toluene containing 1% of tributylamine and then with methanol. The polymer is dried in a vacuum oven at 60° C and one recovers in this manner 490 grams of product with an inherent viscosity of 1.59.

A part of the final product is stabilized by the addition of 0.3% of 4,4'-butylidene bis (3-methyl-6-tert-butyl phenol) and 0.5% of polyamide - 6, the mixture is extruded at a temperature of from 190° to 220° C and from the granulate polymer, bars are obtained by means of injection molding.

The bars (P-7) are subjected to the thermal degradation test.

The test-specimens are subjected to an accelerated ageing test by immersion in demineralized $H_2O$ for 100 hours at 95° C; on completion of the test the bars are dried and once more subjected to the thermal degradation test. The data (P-7) are summarized in Table 3.

For the purpose of comparison a sample of polyoxymethylene identical to that used for the etherification, is acetylated by means of acetic anhydride and at the end of the reaction the acetylated product has an inherent viscosity of 1.60. The acetylated polymer is stabilized and extruded in the same manner as the etherified polymer (P-7).

By means of injection moulding, test bars are obtained which are subjected to the test already described for the etherified polymer. The results (P-8) are summarized in Table 3.

TABLE 3

| | $K_{220}$ |
|---|---|
| (P-7) initial | 0.01 |
| (P-7) aged | 0.02 |
| (P-8) initial | 0.01 |
| (P-8) aged | 0.5 |

EXAMPLE 8

The reactor is charged with 300 grams of hexamethylphosphoric triamide, 600 grams of a mixture of linear paraffins ($C_{12}$–$C_{16}$) identical to those of Example 5, 250 grams of methyl-di-isoamyl orthoformate, 1.6 grams of octadecyl sulphonate, 8 grams of 1,3,5-trimethyl-2,4,6-tris (3,5-di-tert-butyl-4-hydroxybenzyl) benzene and 260 grams of polyoxmethylene obtained as in Example 1 and with an inherent viscosity of 1.25.

The reaction is carried out for 10' at 155° C, the reactor being heated by means of thermostatically controlled oil. The recovered polymer is washed with acetone, then with toluene containing 1% of propylamine and finally with methanol. The drying is effected in a vacuum oven at 60° C and one obtains in this manner 245 grams of polymer with an inherent viscosity of 1.25.

The final polymer (P-9) is stabilized and extruded as described in Example 7, "8" shaped specimens being obtained from the granulate polymer by injection molding.

The test-specimens are subjected to an accelerated ageing test by immersion in H₂O and a detersive agent (pH=11) for 500 hour at 95° C.

After the alkaline test some mechanical properties are determined on the neutralized and dried test-specimens.

The relative data (P-9) are summarized in Table 4.

For the purpose of comparison, a sample of the polyoxymethylene used for the etherification previously described, is subjected to acetylation by means of acetic anhydride and finally one obtains a sample with an inherent viscosity of 1.265.

The acetylated polyoxymethylene is stabilized and extruded in the same manner as in Example 7.

"8" spaced specimens are obtained by injection molding, and said specimens are subjected to the tests previously described.

The results (P-10) are summarized in Table 4.

TABLE 4

|  | Elongation at break (%) ASTM D638 | Tensile strength (Kg/sq.cm) ASTM D638 | Impact strength IZOD (Kg.cm/sq.cm) ASTM D256 |
|---|---|---|---|
| (P-9)initial | 30 | 700 | 10 |
| (P-9) aged | 26 | 680 | 8.0 |
| (P-10)initial | 30 | 700 | 10.0 |
| (P-10) aged | 12 | 660 | 4.0 |

EXAMPLE 9

The reactor is charged as indicated in Example 1 with 500 grams of γ-butyrolacetone, 1000 grams of n-dodecyl benzene, 400 grams of trimethyl orthoformate, 3 grams of perchloric acid, 3 grams of 2,5-di-isopropyl-hydroquinone and 400 grams of polyoxymethylene obtained as in Example 1 and with an inherent viscosity of 1.50.

The reaction is carried out at 145° for 30', the reactor being heated by means of thermostatically controlled oil.

The polymer finally recovered is washed with toluene containing 1% of triethylamine and then with methanol.

The drying is effected in a vacuum oven at 60° C and one obtains 390 grams of polymer with an inherent viscosity of 1.51.

The polymer recovered is stabilized and extruded as described in Example 7 and test bars are obtained from the granulate polymer by means of injection molding; the test-specimens (P-11) are subjected to the alkaline test described in Example 8. After the alkaline attack test the specimens are thoroughly washed with H₂O and dried, and some mechanical properties are then determined.

For the purpose of comparison a sample of polyoxymethylene identical to that used for the above described etherification, is subjected to acetylation by means of acetic anhydride. The acetylated polymer (P-12) has an inherent viscosity of 1.50.

The acetylated polyoxymethylene is then stabilized and extruded according to the same procedure. "8" shaped specimens obtained by injection molding are subjected to the tests previously indicated.

The results are summarized in Table 5.

TABLE 5

|  | Elongation at break (%) ASTM D638 | Tensile strength (Kg./sq.cm) ASTM D638 | Impact strength IZOD (Kg.cm/sq.cm) ASTM D256 |
|---|---|---|---|
| (P-11)initial | 40 | 730 | 14 |
| (P-11) aged | 34 | 700 | 12 |
| (P-12)initial | 730 | 14 |  |
| | 40 | | |
| (P-11) aged | 12 | 670 | 5 |

We claim:

1. A method for the etherification of the unstable terminal hydroxyl groups of an acetal polymer, which comprises bringing said acetal polymer into contact with an etherification reagent selected from the group consisting of orthoesters, epoxides and acetals in the presence of 4-(p-toluenesulphonamide) diphenylamine as an additive stabilizer and subsequently etherifying said acetal polymer in a liquid reaction medium at a temperature of from 50° to 200° C wherein said additive is present in an amount of from 0.05 to 5 parts by weight of said liquid reaction medium.

2. The method of claim 1, wherein said additive is 2,5-di-tert-amyl-hydroquinone.

3. The method of claim 1, wherein said additive is 2,5-di-isopropyl-hydroquinone.

4. The method of claim 1, wherein said additive is 4,4'-thiobis(5-tert-butyl-2-methyl-phenol).

5. The method of claim 1, wherein said additive is para, para'-isopropylenediphenol.

6. The method of claim 1, wherein said additive is 1,1-bis(2-methyl-4-hydroxy-5-tert-butyl-phenyl) butane.

7. The method of claim 1, wherein said additive is 1,1,3-tris(2-methyl-4-hydroxy-5-tert-butyl-phenyl) butane.

8. The method of claim 1, wherein said additive is 1,1,4-tris(2-methyl-4-hydroxy-5-tert-butyl-phenyl) butane.

9. The method of claim 1, wherein said additive is 1,3,5-trimethyl-2,4,6-tris(3,5-di-tert-butyl-4-hydroxybenzyl) benzene.

10. The method of claim 1, wherein said additive is beta (3,5-di-tert-butyl-4-hydroxyphenyl) octadecyl-propionate.

11. The method of claim 1, wherein said additive is pentaerythritol tetra.

12. The method of claim 1, wherein said additive is 1,4-butylenebis propionate.

13. The method of claim 1, wherein said additive is p-phenylenediamine.

14. The method of claim 1, wherein said additive is N,N'-di-sec-butyl-N,N'-dimethyl-p-phenylenediamine.

15. The method of claim 1, wherein said additive is present in an amount of from 0.1 to 1.0 parts by weight for each 100 parts by weight of said liquid reaction medium.

16. The method of claim 1, wherein said etherification is carried out for a period of from 1 to 120 minutes.

17. The method of claim 1, wherein said etherification is carried out at a temperature of from 120° to 180° C.

18. The method of claim 1, wherein said etherification is conducted in the presence of a catalyst.

19. The method of claim 1, wherein for said etherification reagent said orthoesters are selected from the group consisting of orthoformic, orthoacetic and orthocarbonic esters of methyl, ethyl, or higher aliphatic alcohols, of cycloaliphatic alcohols or of aromatic alcohols;

said epoxides are selected from the group consisting of ethylene oxide and propylene oxide; and said acetals are selected from the group consisting of methylal, 1,1-dimethoxyethane and 1,1-dimethoxydimethyl ether.

* * * * *

UNITED STATES PATENT AND TRADEMARK OFFICE
CERTIFICATE OF CORRECTION

PATENT NO. : 4,097,453

DATED : June 27, 1978

INVENTOR(S) : PIERINO RADICI ET AL

It is certified that error appears in the above—identified patent and that said Letters Patent is hereby corrected as shown below:

Col. 12, Claim 2, line 1, after "1," insert -- containing an additional stabilizer additive --.

Col. 12, Claim 3, line 1, after "1," insert -- containing an additional stabilizer additive --.

Col. 12, Claim 4, line 1, after "1," insert -- containing an additional stabilizer additive --.

Col. 12, Claim 5, line 1, after "1," insert -- containing an additional stabilizer additive --.

Col. 12, Claim 6, line 1, after "1," insert -- containing an additional stabilizer additive --.

Col. 12, Claim 7, line 1, after "1," insert -- containing an additional stabilizer additive --.

Col. 12, Claim 8, line 1, after "1," insert -- containing an additional stabilizer additive --.

Col. 12, Claim 9, line 1, after "1," insert -- containing an additional stabilizer additive --.

Col. 12, Claim 10, line 1, after "1," insert -- containing an additional stabilizer additive --.

UNITED STATES PATENT AND TRADEMARK OFFICE
CERTIFICATE OF CORRECTION

PATENT NO. : 4,097,453

DATED : June 27, 1978

INVENTOR(S) : PIERINO RADICI ET AL

Page 2 of 2

It is certified that error appears in the above—identified patent and that said Letters Patent is hereby corrected as shown below:

Col. 12, Claim 11, line 1, after "1," insert -- containing an additional stabilizer additive --.
Col. 12, Claim 12, line 1, after "1," insert -- containing an additional stabilizer additive --.
Col. 12, Claim 13, line 1, after "1," insert -- containing an additional stabilizer additive --.
Col. 12, Claim 14, line 1, after "1," insert -- containing an additional stabilizer additive --.

Signed and Sealed this

Twenty-sixth Day of October 1982

[SEAL]

Attest:

*Attesting Officer*

GERALD J. MOSSINGHOFF

*Commissioner of Patents and Trademarks*